United States Patent
Forsten et al.

(10) Patent No.: US 12,437,298 B2
(45) Date of Patent: *Oct. 7, 2025

(54) METHOD AND SYSTEM FOR VALIDATING TRANSACTION IN CLIENT-SERVER ENVIRONMENT

(71) Applicant: Supercell Oy, Helsinki (FI)

(72) Inventors: Visa Forsten, Helsinki (FI); Niko Derome, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,182

(22) Filed: Jul. 17, 2024

(65) Prior Publication Data

US 2025/0014036 A1 Jan. 9, 2025

Related U.S. Application Data

(63) Continuation of application No. 17/369,166, filed on Jul. 7, 2021, now Pat. No. 12,288,212.

(51) Int. Cl.
*G06Q 20/40* (2012.01)
*H04L 67/10* (2022.01)

(52) U.S. Cl.
CPC ........... *G06Q 20/401* (2013.01); *H04L 67/10* (2013.01)

(58) Field of Classification Search
CPC .............................. G06Q 20/401; H04L 67/10
See application file for complete search history.

(56) References Cited

U.S. PATENT DOCUMENTS

| | | | |
|---|---|---|---|
| 8,843,161 B2* | 9/2014 | Kirik ..................... | H04W 8/183 455/406 |
| 2007/0119923 A1* | 5/2007 | Garrison ............ | G06Q 20/4014 235/380 |

(Continued)

FOREIGN PATENT DOCUMENTS

WO    WO-2015162441 A1 *  10/2015  ............. G06Q 20/02

OTHER PUBLICATIONS

Christopher A. Paul, "2 Requirements, Advantages, and Options" dated 2020, IEEE, https://ieeexplore.ieee.org/document/9242508/authors#authors (Year: 2020).*

(Continued)

*Primary Examiner* — Raven E Yono
(74) *Attorney, Agent, or Firm* — ZIEGLER IP LAW GROUP, LLC.

(57) ABSTRACT

A method of validating a transaction in a client-server environment, the method including: receiving a transaction request from a user at a client device; executing a command at the client device associated with the transaction request based on a state data corresponding to the user at the client device; transmitting a request by the client device to a server for execution of the command at the server, upon the command being executed at the client device; executing the command by the server using a copy of the state data stored on the server, upon receiving the request from the client device, for validating the transaction associated with the transaction request at the client device by the server; and performing one of: allowing the transaction or preventing the transaction, at the client device by the server, based on the execution of the command at the server.

22 Claims, 3 Drawing Sheets

(56) References Cited

U.S. PATENT DOCUMENTS

2018/0330355 A1* 11/2018 Yehuda ................ G06Q 20/202
2019/0333055 A1* 10/2019 Mohammed .......... H04L 9/3234
2020/0047865 A1*  2/2020 Alsina .................... B63H 20/02
2020/0193441 A1*  6/2020 Mokhasi ............ G06Q 20/4012

OTHER PUBLICATIONS

Randy Rachmadi, "Online Game Marketplace for Online Game Virtual Item Transaction" dated Feb. 13, 2020, IEEE https://ieeexplore.ieee.org/document/8992795?source=IQplus (Year: 2020).*

* cited by examiner

METHOD AND SYSTEM FOR VALIDATING TRANSACTION IN CLIENT-SERVER ENVIRONMENT

TECHNICAL FIELD

The present disclosure relates to client-server systems; and more specifically to method and system for validating a transaction in a client-server environment.

BACKGROUND

In gaming application using client-server environment, sometimes cheat applications are used in client devices to give a player (user) of the client device an unfair advantage over other players by commonly exposing one or more game states or other information that otherwise are hidden from the player. In many instances, the cheat applications are also used to modify an expected logic flow of the application, modify values in application memory and intercept and modify client-server messages. Typically, the cheat applications are capable of manipulating a game client program to enhance the abilities of the player. The cheat applications typically use an application programming interface (API) provided along with a game program to manipulate the working of the programs and extract information about the game, or the player might intercept graphics commands issued by the program to the operating system.

Herein, cheating and other unauthorized behavior by the players using the client device may also be perpetrated to harm other players and causes general disruption in the operation of the game. For example, in a gaming environment, a player can attempt to buy a card from a game store and realize that a coin balance is nil and is thus insufficient for purchasing the card legally. The player subsequently utilizes the cheat applications to modify the balance of the bank on the game client to report having enough currency to purchase the card, and receives the cards they were not entitled to on completion of a purchase transaction, which breaks the balance and integrity of the game for all the other users who interact with the player while also causing an economy of the game to be compromised.

In order to keep the client-server-environments consistent and safe, it is required to take authoritative decisions under control either from the client device or a server. However, taking authoritative decisions by the server requires maintaining a separate server code and a client code which could be laborious due to the development time needed to maintain the client codebase and the server codebase separately, and could also possibly cause errors in the game play as it is complex to work across multiple programming languages for the client device and the server. Additionally, maintaining separate client codebase and the server codebase causes overhead at the server as well as the communication layer between the client device and the server. Moreover, if the client device needs to communicate with the server only to get a failure result it leads to further overhead.

Therefore, in light of the foregoing discussion, there is a need to overcome the aforementioned drawbacks associated with the existing techniques for providing a method and a system for validating a transaction in a client-server environment.

SUMMARY

The present disclosure seeks to provide a method of validating a transaction in a client-server environment. The present disclosure also seeks to provide a system for validating a transaction in a client-server environment. An aim of the present disclosure is to provide a solution that overcomes at least partially the problems encountered in prior art by providing a technique for validating a transaction in the client-server environment using a common logic code sensitive to game logic on the client device and the server, for ensuring security and consistent player experience, where a command associated with the common logic code is executed on the client device as well as the server using a copy of a state data maintained in an uncompromised state on the server, for validating the transaction by the server. The command is written in a programming language for either the client device or the server, converted to another programming language for the other, executed on both the client device and the server while maintaining a logic synchronization and the results of the execution of the command are compared for consistency and validating the transaction.

In one aspect, the present disclosure provides a method of validating a transaction in a client-server environment, the method comprising:
  receiving a transaction request from a user at a client device;
  executing a command at the client device associated with the transaction request based on a state data corresponding to the user at the client device;
  transmitting a request by the client device to a server for execution of the command at the server, upon the command being executed at the client device;
  executing the command by the server using a copy of the state data stored on the server, upon receiving the request from the client device, for validating the transaction associated with the transaction request at the client device by the server; and
  performing one of: allowing the transaction or preventing the transaction, at the client device by the server, based on the execution of the command at the server.

In another aspect, an embodiment of the present disclosure provides a system for validating a transaction in a client-server environment, the system comprising:
  a client device configured to:
    receive a transaction request from a user;
    execute a command associated with the transaction request based on a state data corresponding to the user thereat; and
    transmit a request to a server for execution of the command at the server, upon the command being executed at the client device; and
  the server communicatively coupled to the client device via a network, the server configured to:
    execute the command using a copy of the state data stored thereon, upon receiving the request from the client device, for validating the transaction associated with the transaction request at the client device; and
    perform at least one of: allowing the transaction or preventing the transaction, at the client device by the server, based on the execution of the command at the server.

Embodiments of the present disclosure substantially eliminate or at least partially address the aforementioned problems in the prior art, and provide a technique for validating a transaction in a client-server environment by using a common command on a client device and a server based on a logic synchronization that reduces an overhead needed to maintain a separate client codebase and a server codebase, and the communication layer between and also reduces any additional overhead caused by the client device communicating with the server only to get a failure result.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
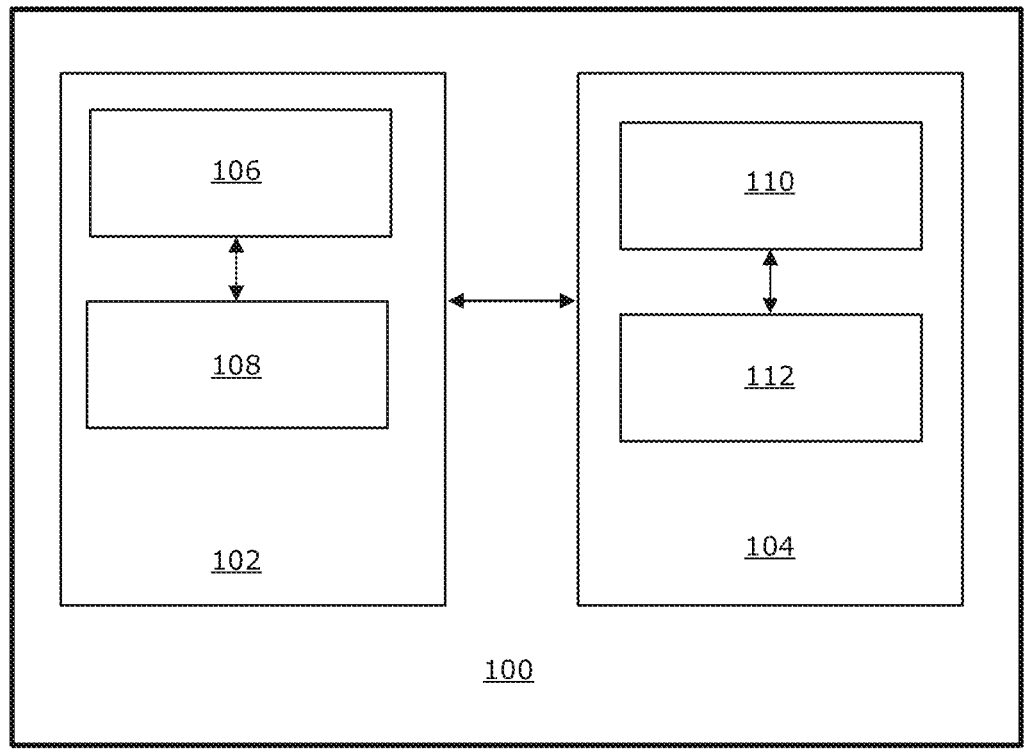
FIG. 1 is a schematic illustration of a system for validating a transaction in a client-server environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, the present disclosure provides a method of validating a transaction in a client-server environment, the method comprising:

receiving a transaction request from a user at a client device;

executing a command at the client device associated with the transaction request based on a state data corresponding to the user at the client device;

transmitting a request by the client device to a server for execution of the command at the server, upon the command being executed at the client device;

executing the command by the server using a copy of the state data stored on the server, upon receiving the request from the client device, for validating the transaction associated with the transaction request at the client device by the server; and performing one of: allowing the transaction or preventing the transaction, at the client device by the server, based on the execution of the command at the server.

In another aspect, the present disclosure provides a system for validating a transaction in a client-server environment, the system comprising:

a client device configured to:

receive a transaction request from a user;

execute a command associated with the transaction request based on a state data corresponding to the user thereat; and transmit a request to a server for execution of the command at the server, upon the command being executed at the client device; and the server communicatively coupled to the client device via a network, the server configured to:

execute the command using a copy of the state data stored thereon, upon receiving the request from the client device, for validating the transaction associated with the transaction request at the client device; and perform at least one of: allowing the transaction or preventing the transaction, at the client device by the server, based on the execution of the command at the server.

The present disclosure provides a method for validating a transaction in a client-server environment. The method of the present disclosure validates the transaction upon receiving a transaction request from a user of the client device by executing a command on the client device and the server. The execution of the command on the client device and the server ensures security and consistent player experience. The method of the present disclosure prevents a cheat application from providing any unfair advantage to a user over other users by execution of the common command on the server using a copy of the state data in an uncompromised state on the server and validating the transaction based on the execution of the command.

The method comprises receiving a transaction request from a user at a client device. Throughout the present disclosure, the term "transaction request" refers to a request for a transaction that comprises exchanging one or more resources to acquire an asset by the user in an application on the client device. The client device includes, but is not limited to, a computer, a mobile phone, a laptop computer, a tablet, a thin computing device, a personal digital assistant (PDA), a portable computing device, a virtual machine, or a suitable device with a processor. In certain configurations, the client device can represent an audio player, a game console, a camera, a camcorder, an audio device, a video device, a multimedia device, or a device capable of supporting a connection to a remote computing device. In an embodiment, the client device comprises at least a processor and a memory.

The method comprises executing a command at the client device associated with the transaction request based on a state data corresponding to the user at the client device. Throughout the present disclosure, the term "state data" refers to data associated with one or more state parameters associated with a client-server interaction in a client-server environment. The client-server environment includes the client device, including one or more processors, a memory and optionally including a microphone, a speaker, a display, and the server. For example, the state data may refer to any data relevant to a computer-implemented game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the gameplay of a player or in response to the game engine (e.g., based on the game logic).

Optionally, the state data is stored in the memory associated with the client device. The memory may store content and data relating to, and enabling, operation of the client-server environment as digital data objects. The digital data objects may include objects of digital information typically stored or embodied in a data file, database, or record. The content may include, for example, text, images, graphics (vector-based or bitmap), audio, video, or other multimedia, and combinations thereof. The content object data may also include executable code objects (e.g., games executable within a browser window or frame) and the like.

Optionally, the state data is stored in one or more of a variety of separate and integrated databases associated with the client device, such as relational databases and object-oriented databases, that maintain information as an integrated collection of logically related records or files stored on one or more physical systems.

Optionally, the resources comprise credits obtained by the user in an application on the client device. The application can include, for example a game application, a virtual reality application, an augmented reality application, and other client-server interaction-based applications. Such resources may be earned by the user by using actual currency and/or over the course of gameplay by completing some challenges or levels, and the like.

Optionally, the execution of the command is based on verification of existence of a sufficient resource balance for completing the transaction. That is, the command is only executed when there is sufficient resource balance required for completing the transaction. As discussed, the resource balance may refer to current (remaining) balance of some virtual currency or credits used in the application (e.g., the game application).

Optionally, the transaction comprises exchanging the resources to acquire an asset by the user in an application on the client device. As discussed, the resource balance may refer to some virtual currency or credits used in the application. Such resources may be used by the user in the gameplay for purchase of various items, like new weapons, powers, character upgrades, etc. in the game; for example, to enhance the gameplay and the like.

Herein, the command is executed on the client device for initiating a transaction based on the transaction request. For example, if a user intends to perform a purchase transaction using some credits while using a game application on the client device, the user sends a request for purchase transaction to the client device and the client device executes the command to initiate the transaction. Notably, the execution of the command succeeds upon existence of sufficient resource balance in the state data associated with the user and the execution of the command fails upon non-existence of sufficient resource balance in the state data associated with the user.

The method further comprises transmitting a request by the client device to a server for execution of the command at the server, upon the command being executed at the client device. Notably, in some embodiments, the request is transmitted to the server upon successful execution of the command at the client device, upon existence of sufficient resource balance in the state data associated with the user. In some embodiments, upon non-existence of sufficient resource balance in the state data, the execution of the command fails terminating the transaction and no message is sent to the server. Notably, the request for execution of the command is transmitted to the server, for the server to validate a transaction associated with the transaction request using a copy of the state data on the server. In several instances the state data on the client device may be compromised by the user using cheat applications on the client device. However, the copy of the state data on the server remains uncompromised and is thus used for validating the transaction.

Optionally, the client device is communicatively coupled to the server via a communication network. In several embodiments, the server includes, but is not limited to, a computer, a laptop computer, a computing device, a virtual machine, a desktop session, a published application, or a suitable device with a processor. In several embodiments, the server includes one or more computing devices.

Optionally, the client device connects to the server over the communication network, for example, via a modem connection, a local area network connection including for example, an ethernet or a broadband, a wide area network connection or a mobile network connection. Examples of the communication network includes, but is not limited to a local area network (LAN) network, a wide-area network (WAN) network, a wireless network, the internet, an intranet or other network.

The method further comprises executing the command by the server using a copy of the state data stored on the server, upon receiving the request from the client device, for validating the transaction associated with the transaction request at the client device by the server. Herein, executing the command by the server comprises converting the command associated with the client device to a server command executable at the server based on a logic code of the client device. Notably, the logic code written once for the client device is re-used on the server. In several embodiments, the logic code can be re-used on multiple platforms, eliminating the need to write separate code to handle the logic on various devices or platforms. Additionally, a messaging layer from the client device to the server is also converted by re-using the logic code. Re-using of the logic code or common command reduces the overhead from development time needed to maintain a separate client codebase and a server codebase and the communication layer between the client device and the server.

Herein, the copy of state data on the server is stored on a server memory and is not compromised by cheat applications that could be used by a user on the client device. Since the copy of the state data on the server is not compromised, the execution of the command on the server enables validation of the transaction. For example, if the execution of the command on the client device indicates existence of sufficient resource balance in the state data on the client device, the execution of the command on the server verifies if the sufficient resource balance truly exists in the copy of the state data and is not tampered or compromised by the user using a cheat application on the client device and thus enables validation of the transaction.

The method further comprises performing one of: allowing the transaction or preventing the transaction, at the client device by the server, based on the execution of the command at the server. Herein, if the command also succeeds at the server, the server notifies the client device of the success of the command that would in turn validate the presence of sufficient resource balance in the state data, and thereby the command is performed on both the client device and the server, for keeping the state data and the copy of the state data synchronized. If the command fails, the server will notify the client device of failure of the command and the client device handles the error case, by for example, ending the session and the state data is maintained in a valid state. It may be understood that herein, the transaction is allowed upon existence of sufficient resource balance in the copy of the state data on the server and the transaction is prevented upon non-existence of sufficient resource balance in the copy of the state data on the server.

Optionally, executing the command at the server comprises converting the command associated with the client device to a server command executable at the server based on a logic code of the client device. Herein, the command (sometimes referred to hereinafter as the common command) is written in a programming language for either client device or the server, converted to another programming language for the other and the results of the execution of the command are compared for consistency and validation of the transaction. The common command is associated with a common logic code (thereby maintaining a logic synchronization). The common command is sensitive to a game logic on the client device and the server, and is executed on the client device using a state data associated with the user and on the server using a copy of the state data maintained in an uncompromised state on the server, for validating the transaction by the server. The validation of the transaction by the server based on the logic synchronization by re-using of the logic code written once for the client device and re-used on the server reduces an overhead needed to maintain a separate client codebase and a server codebase, and also reduces an overhead due to a communication layer between the client device and the server that would otherwise be required while using separate codebases on the client device and the server.

In several embodiments, the logic code can be re-used on multiple platforms associated with the client-server environment, eliminating the need to write separate code to handle the logic on various devices or platforms. Additionally, a messaging layer from the client device to the server is also converted by re-using the logic code. The method of the present disclosure also reduces any additional overhead caused by the client device communicating with the server only to get a failure result.

Optionally allowing the transaction or preventing the transaction, at the client device by the server comprises generating a trust score for the user by the server based at least on one or more previous transactions of the user and validating the transaction based on the trust score of the user. Notably, a first user who repeatedly gets an allowance for the transaction during several instances may get a higher trust score when compared to a second user who may fail in some instances. The higher trust score may lead to the server allowing the transaction by the first user in some instances without the need of validating the transaction at the server for each such instance. This may help with reducing the overhead at the server for validating each and every transaction. It may be appreciated that the instances when the transaction may not be validated at the server for users with a high trust score (i.e. trust score above a predefined threshold) could be randomly (pseudo-randomly) decided, so that even the user with a high trust score may not be able to cheat the transaction validation function of the server.

The present disclosure also relates to the system as described above. Various embodiments and variants disclosed above apply mutatis mutandis to the system.

The system of the present disclosure validates a transaction upon receiving a transaction request from a user of the client device by executing a common command on a client device and a server. The system of the present disclosure ensures security and consistent player experience by execution of the common command on the client device and the server. Further, the common command is associated with a common logic code and is sensitive to a game logic on the client device and the server and is executed on the client device as well as the server using a copy of a state data maintained in an uncompromised state on the server, for validating the transaction by the server. Additionally, the common command (referred to hereinafter as the command) is written in a programming language for either the client device or the server, converted to another programming language for the other and the results of the execution of the command are compared for consistency and validation of the transaction. The system of the present disclosure reduces an overhead needed to maintain a separate client codebase and a server codebase, and also reduces an overhead due to a communication layer between the client device and the server that would otherwise be required while using separate codebases on the client device and the server by validation of the transaction by the server based on the logic synchronization by re-using of the logic code written once for the client device on the server. The system of the present disclosure also reduces any additional overhead caused by the client device communicating with the server only to get a failure result. In several embodiments, the logic code can be re-used on multiple platforms associated with the client-server environment, eliminating the need to write separate code to handle the logic on various devices or platforms. Additionally, a messaging layer from the client device to the server is also converted by re-using the logic code.

The system comprises a client device and a server communicatively coupled to the client device via a network, the client device is configured to receive a transaction request from a user, execute a command associated with the transaction request based on a state data corresponding to the user thereat and transmit a request to a server for execution of the command at the server, upon the command being executed at the client device.

Optionally, the execution of the command is based on verification of existence of a sufficient resource balance for completing the transaction.

Optionally, the transaction comprises exchanging the resources to acquire an asset by the user in an application on the client device.

Optionally, the resources comprise credits obtained by the user in an application on the client device.

The system comprises the server configured to execute the command using a copy of the state data stored thereon, upon receiving the request from the client device, for validating the transaction associated with the transaction request at the client device and perform at least one of: allowing the transaction or preventing the transaction, at the client device by the server, based on the execution of the command at the server.

Herein, the term "server" refers to a structure and/or module that includes programmable and/or non-programmable components configured to store, process and/or share information. Specifically, the server includes any arrangement of physical or virtual computational entities capable of enhancing information to perform various computational tasks. Furthermore, it should be appreciated that the server may be a single hardware server and/or plurality of hardware servers operating in a parallel or distributed architecture. In an example, the server may include components such as memory, at least one processor, a network adapter and the like, to store, process and/or share information with other entities, such as a broadcast network or a database for storing a copy of the state data.

Optionally, the server is configured to convert the command associated with the client device to a server command executable at the server based on a logic code of the client device, for executing the command at the server. For example, the client device and the server may be configured to operate on different operating systems, the command executable on the client device is converted to a command executable on the operating system of the server.

Optionally, the transaction is allowed upon existence of sufficient resource balance in the copy of the state data on the server and the transaction is prevented upon non-existence of sufficient resource balance in the copy of the state data on the server.

Optionally, the server is configured to generate a trust score for the user by the server based at least on one or more previous transactions of the user and validate the transaction based on the trust score of the user.

The present disclosure further provides a computer program product comprising a non-transitory computer-readable storage medium having computer-readable instructions stored thereon, the computer-readable instructions being executable by a computerized device comprising processing hardware to execute the method as described above.

DETAILED DESCRIPTION OF THE DRAWINGS

FIG. 1 is a schematic illustration of a system 100 for validating a transaction in a client-server environment, in accordance with an embodiment of the present disclosure. The system 100 comprises a client device 102 and a server 104 communicably coupled to the client device 102. As illustrated, the client device 102 is communicably coupled to the server 104 via a communication network (not shown). The client device 102 comprises a memory 106 and a processor 108. The server 104 comprises a server memory 110 and a server processor 112.

The memory 106 and/or the server memory 110 includes one or more of a large class of data storage and management systems and may be implemented by any suitable physical system(s) including components, such as one or more database servers, mass storage media, media library systems, storage area networks, data storage clouds, databases (e.g., MySQL), and/or data warehouses.

The processor 108 and/or the server processor 112 includes one or more general-purpose processing devices such as a microprocessor, a central processing unit, a complex instruction set computing (CISC) microprocessor, a reduced instruction set computing (RISC) microprocessor, a very long instruction word (VLIW) microprocessor, or processor implementing other instruction sets, or processors implementing a combination of instruction sets, one or more special-purpose processing devices such as an application specific integrated circuit (ASIC), a field programmable gate array (FPGA), a digital signal processor (DSP), network processor, or the like. The processor 108 and/or the server processor 112 is configured to execute instructions for performing the operations and steps discussed herein. The memory 106 is configured to store the state data associated with the user and the server memory 110 is configured to store a copy of the state data associated with the user.

The server 104 and the client device 102 may include one or more other components such as a network adapter and the like, to store, process and/or share information with other entities, such as a broadcast network or a database for receiving and storing the copy of the state date.

It may be understood by a person skilled in the art that the FIG. 1 is merely an example for sake of clarity, which should not unduly limit the scope of the claims herein. The person skilled in the art will recognize many variations, alternatives, and modifications of embodiments of the present disclosure.

Figure 2:
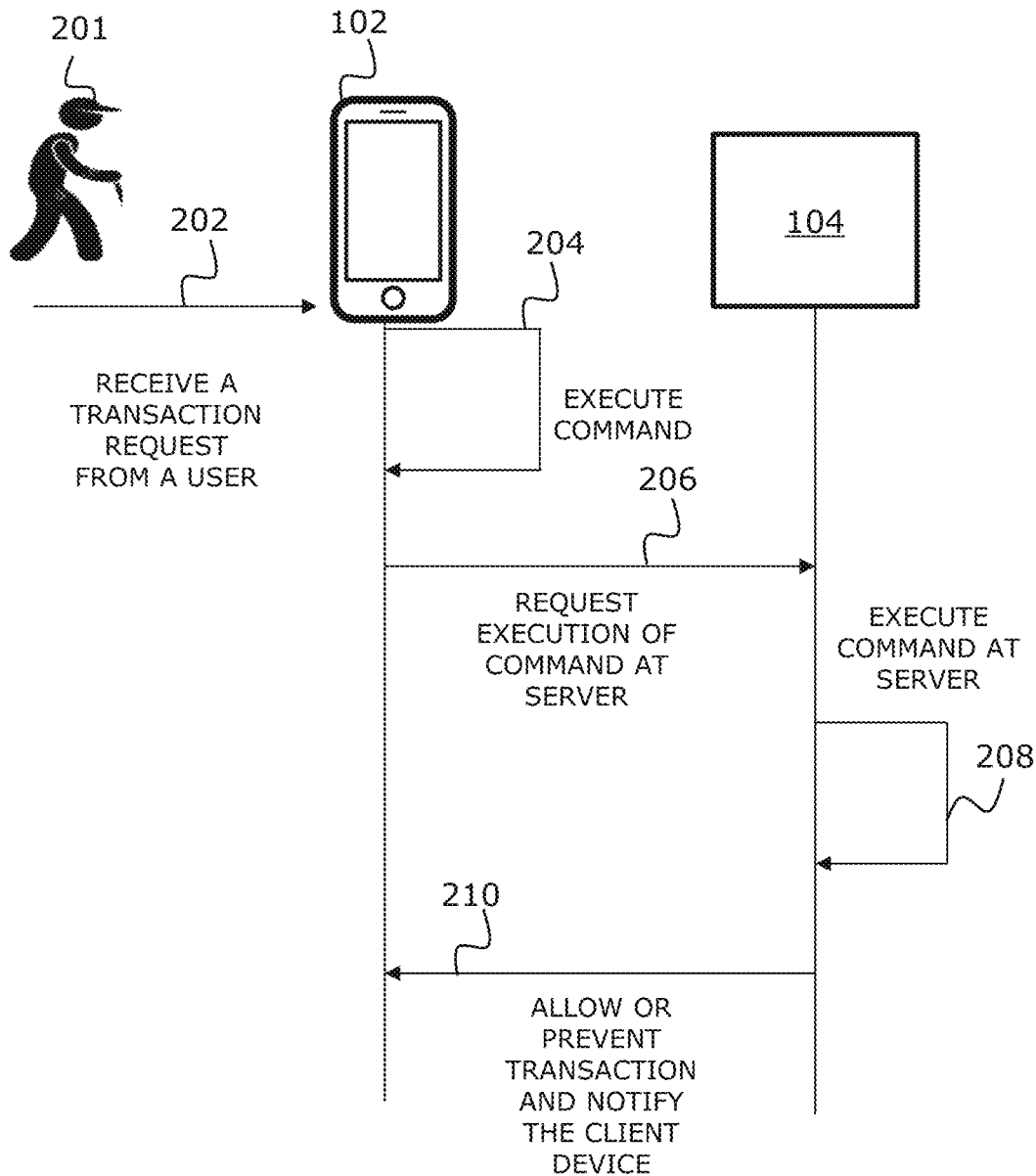
FIG. 2 is an interaction diagram illustrating an exemplary scenario of validating a transaction in a game environment, in accordance with an exemplary scenario.

FIG. 2 is an interaction diagram illustrating an exemplary scenario of validating a transaction in a game environment, in accordance with an exemplary scenario. As depicted in FIG. 2, at step 202, a user 201 despite having a nil resource balance in his game account attempts to buy a card from a store in the game environment in a client device (such as, the client device 102 of FIG. 1) and accordingly sends a transaction request, to the client device 102. The user 201 utilizes a cheat application to modify the resource balance to report having enough currency to the client device 102 so as to purchase the card, during the transaction. At step 204, a command associated with the transaction request is executed at the client device 102 due to sufficient resource balance being shown to the client device 102 in the state data associated with the user compromised by the cheat application. The command succeeds and at step 206, a request is transmitted by the client device to a server (such as, the server 104 of FIG. 1) for execution of the command at the server. At step 208, the server 104 executes the command using a copy of the state data stored on the server 104, and the command fails as the copy of the state data is not compromised by the cheat application and hence will not reflect existence of a sufficient resource balance in the copy of the state data. At step 210, the server 104 prevents the transaction and notifies the client device 102.

Figure 3:
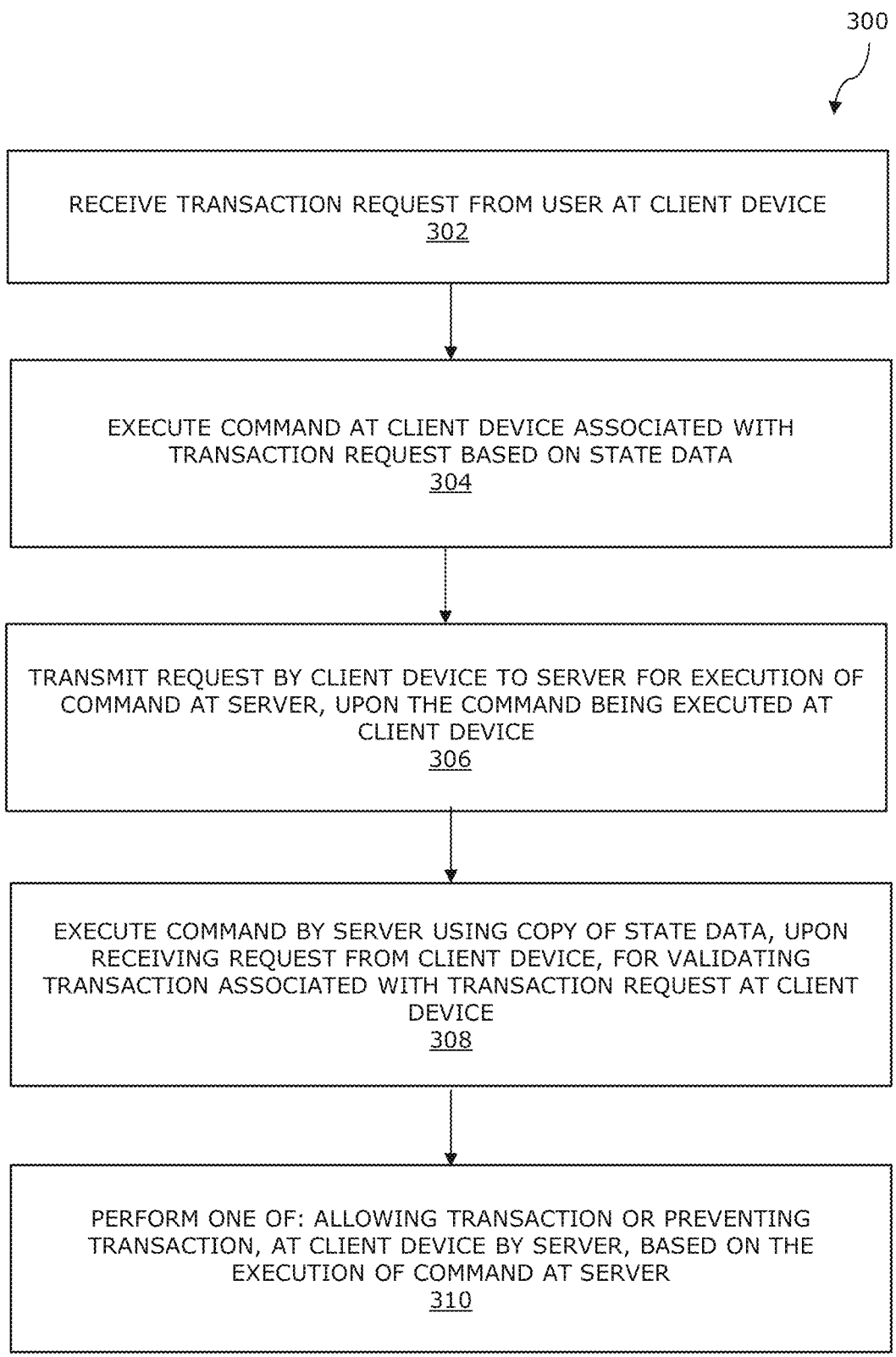
FIG. 3 is a flowchart of a method listing steps for validating a transaction in a client-server environment, in accordance with an embodiment of the present disclosure.

FIG. 3 is a flowchart of a method 300 listing steps for validating a transaction in a client-server environment, in accordance with an embodiment of the present disclosure. At step 302, a transaction request is received from a user at a client device. At step 304, a command associated with the transaction request is executed at the client device based on a state data corresponding to the user at the client device. At step 306, a request is transmitted by the client device to a server for execution of the command at the server, upon the command being executed at the client device. At step 308, the command is executed by the server using a copy of the state data stored on the server, upon receiving the request from the client device, for validating the transaction associated with the transaction request at the client device by the server. At step 310, one of: allowing the transaction or preventing the transaction, at the client device is performed by the server, based on the execution of the command at the server.

It has to be noted that all devices, modules, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of validating a purchase transaction in a game application of a client-server game environment, the method comprising:
   processing, in a special purpose processor of a client device operating on a first operating system, a request for the purchase transaction initiated at the client device;
   verifying a resource balance in the game application for completing the purchase transaction,
   executing a command associated with common logic code of game logic of the game application at the client device to initiate the request for the purchase transaction;
   transmitting a request by the client device to a server over a network, the server operating on a second operating system different from the first operating system, for execution of the command at the server only after executing the command at the client device;
   executing the command by a special purpose processor of the server, the special purpose processor configured to first, convert the command from the client device into a format executable at the server based on a logic code of the client device, and second, execute the converted command using a copy of state data stored in an uncompromised state on a memory of the server, wherein a successful execution of the converted command at the server requires a sufficient resource balance in the copy of the state data stored in the memory of the server, and the server validating the purchase transaction associated with the request for the purchase transaction at the client device upon successful execution of the converted command by the server, and wherein the validation of the purchase transaction by the server is based on logic synchronization by re-using the logic code of the client device on the server;
   wherein the server is further configured to update a resource balance associated with the state data stored in the memory of the server; and
   the client device is configured to perform the purchase transaction upon receipt of the notification by the server and update the resource balance in the state data stored in the memory of the client device.

2. The method according to claim 1, wherein, a copy of the logic code of the client device is stored at the server for executing the server command by the server.

3. The method according to claim 1, wherein the purchase transaction is prevented upon a non-existence of the sufficient resource balance in the copy of the state data on the server.

4. The method according to claim 1, wherein validation of the purchase transaction by the server further comprises:
   generating a trust score for a user of the client device by the server based at least on one or more previous purchase transactions of the user; and
   validating the purchase transaction based on the trust score of the user.

5. The method according to claim 1, wherein the resource balance comprises credits obtained by playing the game application on the client device.

6. The method according to claim 1, wherein the purchase transaction comprises exchanging one or more resources associated with a user of the client device to acquire an asset in the game application operating on the client device, wherein the one or more resources comprise credits associated with the user in the game application and the asset is a game item in the game application and wherein the server is configured to notify the client device of the validation of the purchase transaction and the client device is configured to perform the purchase transaction by electronically exchanging the one or more resources for the asset.

7. The method according to claim 1, wherein the command is executed after the resource balance is verified as a sufficient resource balance.

8. The method according to claim 1, wherein the server is further configured to notify the client device of the validation of the purchase transaction.

9. A system for validating a purchase transaction in a game application of a client-server game environment, the system comprising:
   a client device operating on a first operating system, comprising a special purpose processor configured to execute non-transitory machine-readable instructions, which when executed by the special purpose processor cause the client device to:
      process a request for the purchase transaction initiated at the client device;
      verify a resource balance in the game application for completing the purchase transaction,
      execute a command associated with common code logic of game logic of the game application to initiate the request for the purchase transaction;
      transmit a request by the client device to a server operating on a second operating system different from the first operating system. over a network. for execution of the command at the server only after executing the command at the client device;
   the server being configured to:
      convert the command from the client device into a format executable at the server based on a logic code of the client device and execute the converted command using a copy of state data stored in an uncompromised state on a memory of the server, wherein a successful execution of the converted command at the server requires a sufficient resource balance in the copy of the state data stored in the memory of the server, wherein the server is configured to validate the purchase transaction associated with the request for the purchase transaction at the client device upon successful execution of the converted command by the server, and wherein the validation of the purchase transaction by the server is based on logic synchronization by re-using the logic code of the client device on the server;

wherein the server is further configured to update a resource balance associated with the state data stored in the memory of the server; and the client device is configured to perform the purchase transaction upon receipt of the notification from the server and update the resource balance in the state data stored in the memory of the client device.

10. The system according to claim 9, wherein a copy of the logic code of the client device is stored at the server, for executing the converted command by the server.

11. The system according to claim 9, wherein the purchase transaction is prevented upon a non-existence of the sufficient resource balance in the copy of the state data on the server.

12. The system according to claim 9, wherein the server is further configured to:

generate a trust score for a user of the client device by the server based at least on one or more previous purchase transactions of the user; and validate the purchase transaction based on the trust score of the user.

13. The system according to claim 9, wherein the resource balance comprises credits obtained by playing the game application on the client device.

14. The system according to claim 9, wherein the purchase transaction comprises exchanging one or more resources associated with a user of the client device to acquire an asset in the game application operating on the client device, wherein the one or more resources comprise credits associated with the user in the game application and the asset is a game item in the game application and wherein the server is configured to notify the client device of the validation of the purchase transaction and the client device is configured to perform the purchase transaction by electronically exchanging the one or more resources for the asset.

15. The system according to claim 9, wherein the command is executed after the resource balance is verified as a sufficient resource balance.

16. The system according to claim 9, wherein the server is further configured to notify the client device of the validation of the purchase transaction.

17. A computer program product comprising a non-transitory computer-readable storage medium having computer-readable instructions, the computer-readable instructions configured to be executed by processing hardware of a computerized device to validate a purchase transaction in a client server game environment by:

processing in a special purpose processor of a client device operating on a first operating system, a request for the purchase transaction initiated from the client device;

verifying a resource balance in the game application for completing the purchase transaction;

executing a command associated with common logic code of game logic of the game application at the client device to initiate the request for the purchase transaction;

transmitting a request by the client device to a server over a network, the server operating on a second operating system different from the first operating system, for execution of the command at the server, only after executing the command at the client device;

converting the command from the client device into a format executable at the server based on a logic code of the client device;

executing the converted command by the server using a copy of state data stored on the server in an uncompromised state, wherein a successful execution of the server command at the server requires a sufficient resource balance in the copy of the state data stored in the memory of the server for validating the purchase transaction associated with the request for the purchase transaction at the client device by the server, and wherein the validation of the purchase transaction by the server is based on logic synchronization by re-using of the logic code of the client device on the server;

wherein the server is further configured to update a resource balance associated with the user in the state data stored in the memory of the server; and the client device is configured to perform the purchase transaction upon receipt of the notification by the server and update the resource balance associated with the user in the state data stored in the memory of the client device.

18. The computer program product according to claim 17, wherein, a copy of the logic code of the client device is stored at the server for executing the server command by the server.

19. The computer program product according to claim 17, wherein the purchase transaction is prevented upon a non-existence of the sufficient resource balance in the copy of the state data on the server.

20. The computer program product according to claim 17, wherein the resource balance comprises credits obtained by playing the game application on the client device.

21. The computer program product according to claim 17, wherein the purchase transaction comprises exchanging one or more resources associated with a user of the client device to acquire an asset in the game application operating on the client device, wherein the one or more resources comprise credits associated with the user in the game application and the asset is a game item in the game application and wherein the server is configured to notify the client device of the validation of the purchase transaction and the client device is configured to perform the purchase transaction by electronically exchanging the one or more resources for the asset.

22. The computer program product according to claim 17, wherein the command is executed after the resource balance is verified as a sufficient resource balance.

* * * * *